Figure 5:
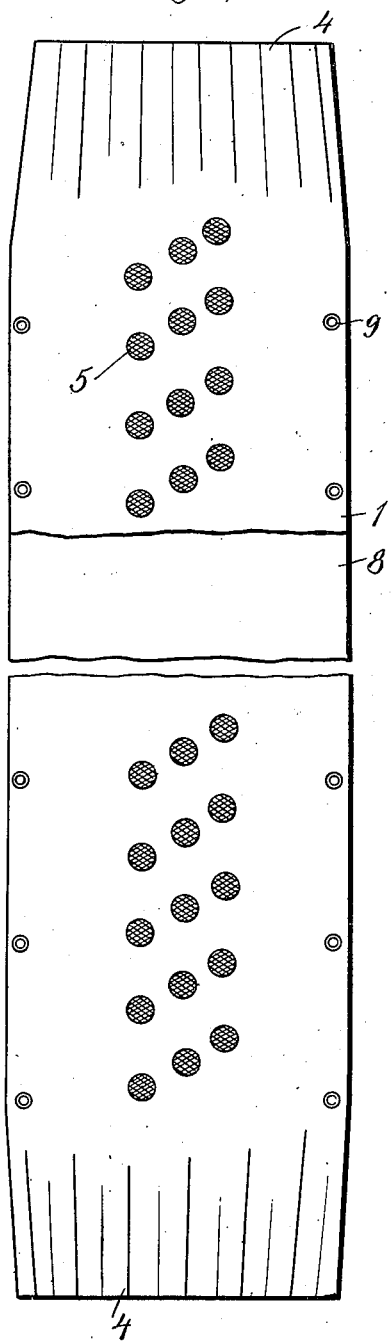

April 1, 1924.
G. F. HOGAN
1,488,544
NONSKID ATTACHMENT FOR VEHICLE WHEELS
Filed Nov. 19, 1921   2 Sheets-Sheet 1
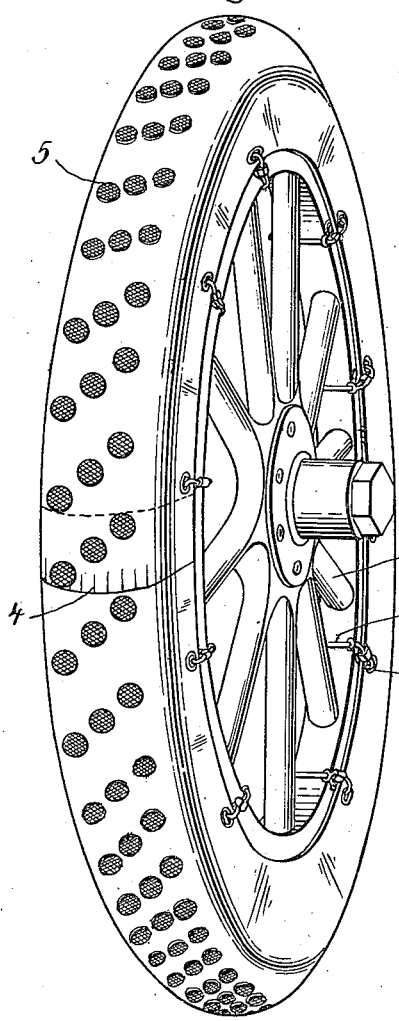
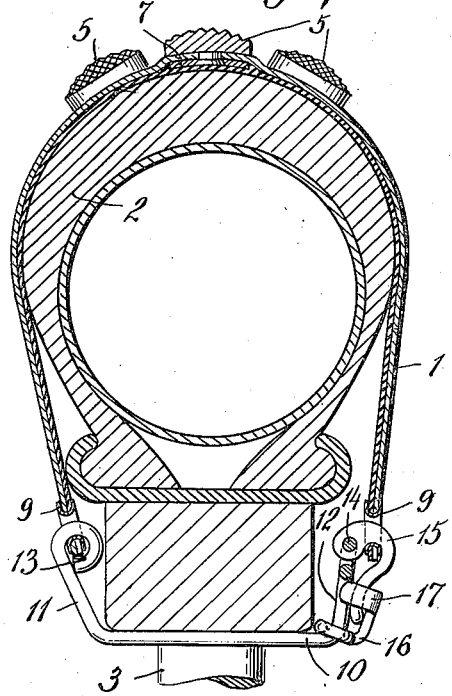
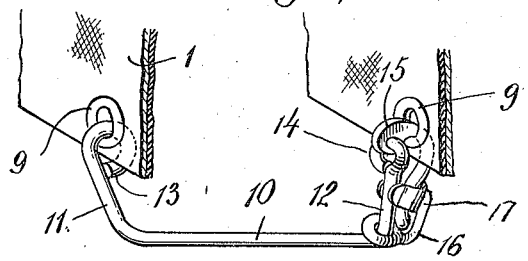
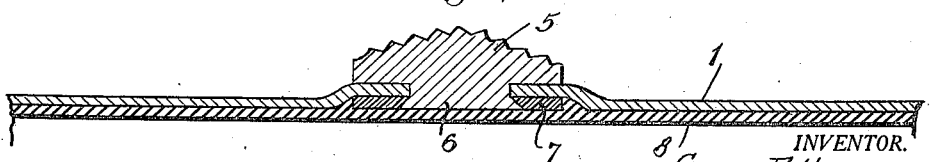
INVENTOR.
George F. Hogan
BY
ATTORNEYS April 1, 1924.

G. F. HOGAN 1,488,544

NONSKID ATTACHMENT FOR VEHICLE WHEELS

Filed Nov. 19, 1921   2 Sheets-Sheet 2

INVENTOR.
George F. Hogan
BY
ATTORNEYS.

Patented Apr. 1, 1924.

1,488,544

UNITED STATES PATENT OFFICE.

GEORGE FRANCIS HOGAN, OF CHICAGO, ILLINOIS.

NONSKID ATTACHMENT FOR VEHICLE WHEELS.

Application filed November 19, 1921. Serial No. 516,290.

*To all whom it may concern:*

Be it known that I, GEORGE F. HOGAN, a citizen of the United States, residing at Chicago, in the county of Cook, State of Illinois, have invented certain new and useful Improvements in Nonskid Attachments for Vehicle Wheels; and I do hereby declare the following to be a full, clear, and exact description of the invention, such as will enable others skilled in the art to which it appertains to make and use the same.

My invention is an improvement in nonskid attachments, and relates particularly to a construction, wherein the functions of nonskid devices and tire armor are combined. Non-skid attachments are of two types, namely those whose only function is to assist traction, and those which combine this function with that of protecting the tire from external injury. In the former class are tire chains. Such devices are in the form of flexible nets of wide mesh, which expose large areas of the tire to the road surface. They afford no protection for the tire, and are liable of themselves to injure the tire. The latter are expensive, unsightly, troublesome to apply and remove, and materially impair the normal cushioning function of the tire.

The object of the present invention is to provide a simple, inexpensive attachment of the character specified, which may be easily applied to the tire and which while materially supplementing the traction of the tire, will at the same time afford sufficient protection against external injury without in any manner impairing the resiliency of the tire.

Figure 6:
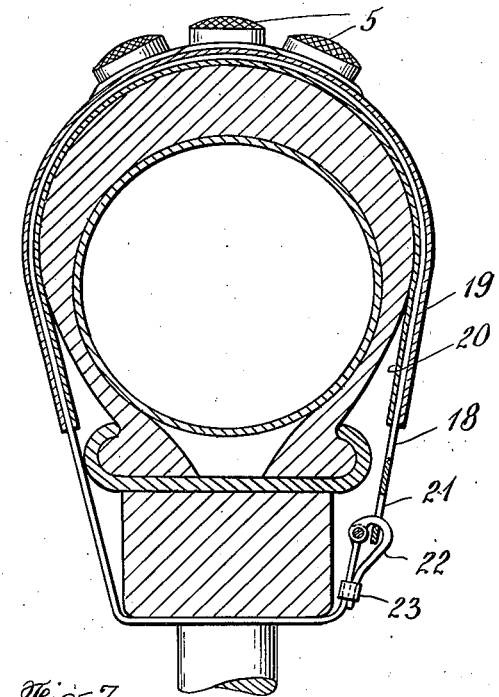
Figure 7:
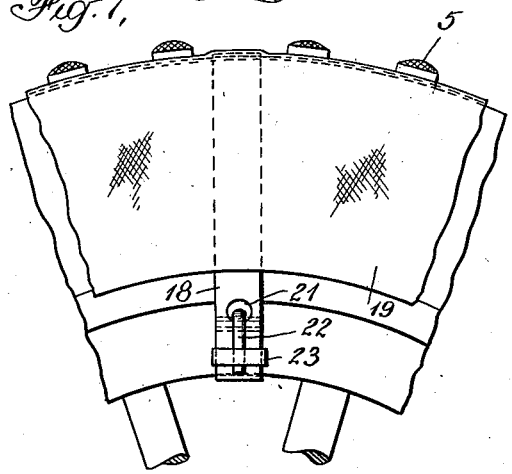

In the drawings;

Figure 1 is a perspective view of a vehicle wheel provided with the improved attachment, Figure 2 is a radial section of the tire and rim of the wheel, Figure 3 is a perspective view of the holding clamp, Figure 4 is an enlarged section at one of the traction studs, Figure 5 is a fragmentary plan view, Figure 6 is a radial section showing an alternate form of clamp or holding means, Figure 7 is a side view of the same.

In the embodiment of the invention shown, the attachment is a strip 1 of flexible material, as for instance heavy canvas, of a length to extend circumferentially of the tire 2 of the wheel 3 upon which it is to be placed, and to lap at its ends. Preferably the ends of the strip are crimped as shown at 4, to cause the said ends to closely engage, to prevent entrance of foreign bodies between the strip and the tire. By thus crimping the overlapping ends of the strip and causing them to closely engage the surface of the tire, the ends are made more rigid and the fastening means, to be later described, is assisted in preventing the rolling up of the end of the outside overlapping margin, which is the natural tendency of two overlapping surfaces positioned in this manner on the outside of a vehicle tire. The strip is of a width to cover the tread, and to extend well beyond the same on each side, and series of headed traction studs to be later described, are connected with the strip. The studs 5 as shown more particularly in Figure 4 have roughened engaging faces, and each stud has a shank 6 which passes through an opening in the strip 1, and through a washer 7 on the opposite side of the strip, and the shank is upset at the washer, to hold the stud to the strip. In practice the studs are discs, which are approximately one and three-quarter inches in diameter, and about one-half inch in height, that is in extension beyond the face of the strip. The studs are preferably arranged as shown in Figures 1 and 5, in lines extending diagonally of the strip. In the present instance there are three studs in each line or series, and the members of the series may be in alinement longitudinally of the strip with corresponding members of the other series, or they may be arranged in staggered relation. A second strip 8 of suitable material is vulcanized to that face of the strip 1 adjacent to the washers 7, covering such washers, and preventing injury of the tire 2 by the washers and the shanks of the studs. The strip 8 also limits movement of the studs with respect to the strip 1. Each side edge of the strip is provided with a number of eyelets 9, and the eyelets are designed for engagement by holding means to hold the strip to the tire.

Any suitable form of holding means may be used. In the present instance, such means be used. In the form of yokes, each comprising a body 10 and arms 11 and 12. The arm 11 of each yoke has an eye 13 which engages an eyelet 9 of the strip. The other arm 12 of each yoke has a similar eye 14, to which is pivoted one arm of an elbow lever 15. This elbow lever is adapted to pass through a registering eye at the opposite side of the strip, and to be swung down upon the arm 12 as shown. The elbow lever is held from displacement by means of a spring clamp 16 mounted to slide on the arm 12 of the yoke. This clamp as shown in Figures 2 and 3 has spring lugs 17 which engage about the adjacent arm of the lever 15 and the arm 12 of the yoke, locking the lever 15 in operative position against the yoke arm. In securing the clamp in place the clamping lever is pressed by the fingers firmly against the arm 12 of the yoke which causes the spring lugs 17 to be sprung outwardly. As their ends pass over the surface of the arm, they spring toward each other, engaging the arm 12 to lock the lever 16 in the final operative position. To release the yoke, the clamping lever 16 is swung outward. This releases the elbow lever 15, which may be swung up and out, and slipped through the eyelet 9. The yokes may be arranged at suitable intervals, as for instance between the alternate pairs of spokes, or between each pair of adjacent spokes as shown. In placing the improved attachment, the strip is laid in front of the wheel to which it is to be applied, with the studs 5 downward, and the wheel is run upon the strip. The strip is now lapped at its ends about the wheel and the holding yokes 10 are operated to connect the side edges of the strip. As shown the strip is of a width such that when in place it will extend radially inward at each side edge beyond the rim of the wheel. The attachment is flexible, conforming closely and easily to each change in the shape of the tire, and in no way impairing the normal function of the tire. There is nothing in the construction of the attachment which might injure the tire, the studs being prevented from direct engagement with the tire by the facing strip 8, and the attachment is in itself a protection for the tire against injury by foreign bodies. While forming a complete covering and armor for the tire, it is of such nature that the tire may function perfectly without interference on the part of the attachment.

In Figures 6 and 7 there is shown an alternate form of clamping means. The said means is in the form of flexible strips 18 of metal, which are arranged at suitable intervals between the strips 19 and 20 which constitute the attachment, corresponding to the strips 1 and 8 of Figure 1. One end of each strip 18 is provided with an eye 21, and the other end with a pivoted elbow lever 22, similar to the lever 15, and operating in the same manner. The lever 22 is held in locking position, by a loop 23 mounted to slide on that end of the strip 18 to which the lever 22 is pivoted. In this construction, the strip 18 is of a length to extend entirely around the tire and the felly of the wheel, and the strip 1 is relieved from the pull of the holding means.

I claim:

1. A non-skid attachment for vehicle tires, comprising a sheet of flexible material of a length to encircle the tire circumferentially with lapping ends, the ends of the sheet being crimped to cause said ends to tightly clasp the tire and prevent the rolling up of the outside overlapping margin, and means for securing the sheet on the tire.

2. A non-skid attachment for vehicle wheels, comprising a sheet of flexible material, of a length to encircle the tire circumferentially with lapping ends, said sheet having at each side edge a series of eyelets, yokes each comprising a body adapted to extend transversely of the felly of a wheel and arms extending laterally from the body, one of said arms being pivoted to an eyelet at one side of the strip, and the other arm having means for engaging an eyelet at the opposite end of the strip and for drawing said eyelet toward the body of the yoke.

3. A non-skid attachment for vehicle wheels comprising, a sheet of flexible material encircling the tire circumferentially and having a plurality of eyelets along each side edge, and means for securing the sheet to the tire including yokes adapted to pass within the felly of the wheel and interconnect opposite eyelets in the edges of the sheet, one end of each yoke having an elbow lever pivoted thereto and adapted to pass through an eyelet and swing toward the yoke to draw the sheet tightly about the tire, the outer end of said lever lying adjacent the yoke in its final position, and means for removably securing said end to the yoke to hold the parts in locked position.

4. A non-skid attachment for vehicle wheels comprising, a sheet of flexible material encircling the tire circumferentially and having a plurality of eyelets along each side edge, and means for securing the sheet to the tire including yokes adapted to pass within the felly of the wheel and interconnect opposite eyelets in the edges of the sheet, one end of each yoke having an elbow lever pivoted thereto and adapted to pass through an eyelet and swing toward the yoke to draw the sheet tightly about the tire, the outer end of said lever lying adjacent the yoke in its final position, and a clasp device adapted to be sprung over said outer end and a portion of the yoke to hold the parts in locked position.

5. A non-skid attachment for vehicle wheels comprising, a sheet of flexible material encircling the tire circumferentially and having a plurality of eyelets along each side edge, and means for securing the sheet to the tire including yokes adapted to pass within the felly of the wheel and interconnect opposite eyelets in the edges of the sheet, one end of each yoke having an elbow lever pivoted thereto and adapted to pass through an eyelet and swing toward the yoke to draw the sheet tightly about the tire, the outer end of said lever lying adjacent the yoke in its final position, and a clasp device pivotally attached to the yoke and adapted to be rotated so as to spring over the outer end of the elbow lever and a portion of the yoke to hold the parts in locked position.

6. A non-skid attachment for vehicle tires comprising, a sheet of flexible material of a length to encircle the tire circumferentially with lapping ends, the ends of the sheet being clamped to cause said ends to tightly clasp the tire and prevent the rolling up of the outside overlapping margin, a plurality of eyelets along each side of the sheet, and means for securing the sheet to the tire including yokes adapted to pass within the felly of the wheel and interconnect opposite eyelets in the edges of the sheet, one end of each yoke having an elbow lever pivoted thereto and adapted to pass through an eyelet and swing toward the yoke to draw the sheet tightly about the tire, the outer end of said lever lying adjacent the yoke in its final position, and means for removably securing the ends to said yoke to hold the parts in locked position.

In testimony whereof I affix my signature.

GEORGE FRANCIS HOGAN.